April 19, 1932. C. H. HAPGOOD 1,854,304
MILKING MACHINE
Filed Dec. 24, 1927    2 Sheets-Sheet 1

WITNESS:

INVENTOR
Cyrus Howard Hapgood
BY
Busser and Harding
ATTORNEYS.

April 19, 1932.  C. H. HAPGOOD  1,854,304
MILKING MACHINE
Filed Dec. 24, 1927   2 Sheets-Sheet 2

WITNESS:
Rob. R. Kitchel.

INVENTOR
Cyrus Howard Hapgood
BY
Busser and Harding
ATTORNEYS.

Patented Apr. 19, 1932

1,854,304

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed December 24, 1927. Serial No. 242,330.

It is known in the art to provide a milking machine comprising a double-chambered teat cup, a pulsation pipe and a secondary pneumatic pulsator connected with, and controlled in its operation by the pulsations in, said pipe, and connected with, and producing pulsations in, the outer chamber of the teat cup, and to provide a vacuum and milk pipe connection from the inner teat cup chamber through the milk claw to the milk pail. It is also known, in such a construction, to provide a vacuum pipe line from the milk pail to the vacuum pump, a primary pneumatic pulsator adapted to produce pulsations in a pipe connected with the secondary pulsator, and electrically operated means, controlled from the pump, for operating the primary pneumatic pulsator. The pulsations from the primary pneumatic pulsator may convey pulsations direct to the outer teat cup chamber, but it is distinctly preferable to provide two pneumatic pulsators, one, a primary pulsator, being directly operated by the electrically operated means and in turn operating another, or secondary pulsator, which produces the pulsations that are conveyed to the outer teat cup chamber. Such a milking machine is disclosed in the Daysh and Hapgood Patent No. 1,405,104, dated January 21, 1922.

In the present invention, which has for its object to improve the Daysh-Hapgood invention, a separate hose, which may be detachably connected with the vacuum line, conveys pneumatic pulsations toward the secondary pulsator (or direct to the pulsation chambers of the teat cups); and the primary operating pulsator and the electrically operating means (e. g., an electro-magnet) for actuating the primary pneumatic pulsator are located at about the junction between the main vacuum pipe line and the detachable hose, being so positioned that when the hose is operatively secured to the vacuum pipe, electrical connections are automatically established which close an electric circuit through said magnet, the milking machine being rendered operative when the cock controlling the flow of air from the hose to the vacuum pipe is opened.

A preferred embodiment of the invention is shown in the accompanying drawings, in which—

The secondary pneumatic pulsator (which is preferably but not necessarily employed) may be of the construction shown in the Leitch Patent No. 1,255,186, dated Feb. 5, 1918. It comprises (see Fig. 1) a tubular casing $b$ forming a pulsation chamber communicating with a pulsation pipe $d$ and with a vacuum pipe $e$ and having nipples for connection with the pulsation chambers of the teat cups $a$; a pulsator valve in said chamber operable by pneumatic pulsations communicated through pulsation pipe $d$; and a tubular casing forming a milk chamber $c$ communicating with a milk pipe $f$ and having nipples adapted for connection with the milk chambers of the teat cups. Milk pipe $f$ connects with the interior of the milk pail $g$. If a secondary pulsator is not employed, pipe $d$ may be directly connected to the outer chambers of the teat cups.

On the cover of the milk pail is a casing divided by a web into a pulsator chamber $h$ and a vacuum chamber $i$. The vacuum chamber communicates, through one or more check valves $j$, with the interior of the milk pail. The chambers $h$ and $i$ have nipples adapted to respectively receive the hose 20 and the hose 21, which, while shown, except at one end, as independent tubes, may be integrally connected throughout so as to be handled as a unit.

Figure 1:
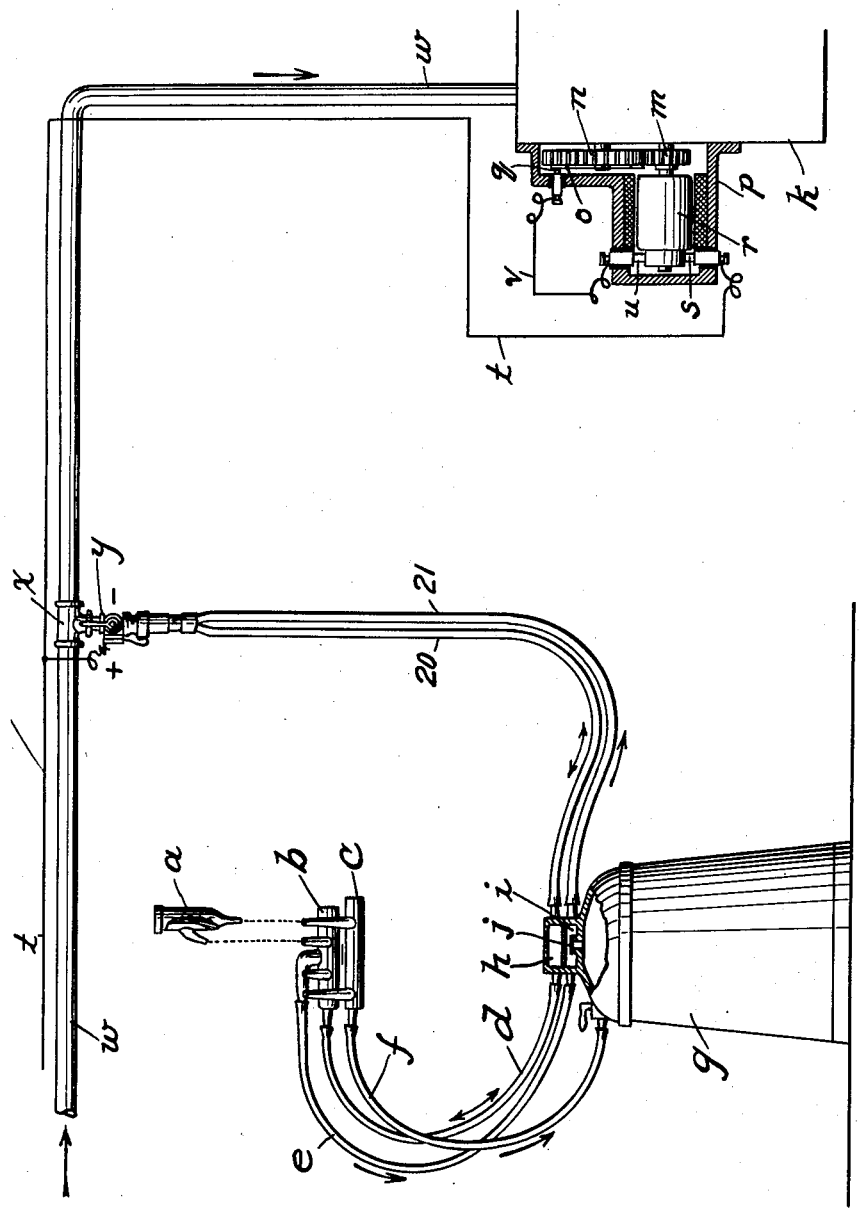
Fig. 1 is a side elevation, partly in section, of a complete milking machine.

The shape of the vacuum pump $k$ (which may be of the type shown in the Leitch Patents 1,367,554 and 1,378,881 and the Hall Patent 1,374,650 and is diagrammatically shown in Fig. 1) has a pinion $m$ which is in driving connection with a gear $n$ carrying a semi-circular contact strip $o$. Affixed to the pump casing is a casing $p$ enclosing an electric generator $r$ as well as pinion $m$ and gear $n$. When the milking machine is in operation, one of the brushes $s$ of the generator is connected, through an electric conducting line $t$ and other electrical connections hereinafter described, with one pole of the magnet that actuates the primary pneumatic pulsator, to be also hereinafter described. The other brush $u$ of the generator is connected, through an electrical connection $v$, with a brush $q$ carried on the pump casing and adapted, in the rotation of gear $n$, to intermittently contact with contact strip $o$, from which, through the pump casing, the current flows through the vacuum pipe line $w$.

Vacuum pipe $w$ is provided with any desired number of T couplers $x$, one arm of each coupler having a valve casing $y$ threaded thereon, from which depends a nozzle 10. A valve $z$ controls communication between nozzle 10 and vacuum pipe $w$.

Covered by and insulated from the valve casing are a bracket 11 and a flexible and elastic contact finger 12. Bracket 11 carries a binding post 13, by which conducting wire $t$ is secured to the bracket.

The ends of hose 20 and 21 opposite the ends that are attachable to the casing on the milk pail are secured in a tubular connecting member 15, which carries the primary pulsator and its actuating magnet. Within tubular member 15 is a tube 16, which connects with hose 21 and is in turn connected with a tube 17 that extends through the magnet 22 and is provided at its upper end with an enlarged head 18 threaded to receive a nut 19, which engages the end of member 15. Tube 17 slips directly on nozzle 10.

Between tube 17 and the inner wall of member 15 is a magnet 22 carrying a spring armature 23, the free end of which carries a valve 24 positioned between an opening 25 in the wall of the connector and an opening 26 in the wall of tube 16.

One terminal of the magnet is in electrical connection with tubes 16 and 17 and therefore also with nozzle 10, valve casing $y$, coupler $x$ and vacuum pipe $w$ when tube 17 is slipped on nozzle 10.

The other terminal of the magnet is connected with a connector 27 which extends through a hole in the wall of connecting member 15 and through a ring 28 of insulating material surrounding member 15. On the outer wall of ring 28 is a contact plate 29 (a part of which is bent in to form the connector 27) lying against strip 28 and adapted, when the hose 20, 21 are connected with vacuum pipe $w$, to engage the end of finger 12 and thereby electrically connect the last named terminal of the magnet with electrical connection $t$.

It should be stated that tube 17, spring 23, valve 24, the housing containing port 25, casing 15 and nut 19 are of iron or steel, thus forming a magnetic circuit, while tube 16 is of brass or non-magnetic material.

Figure 2:
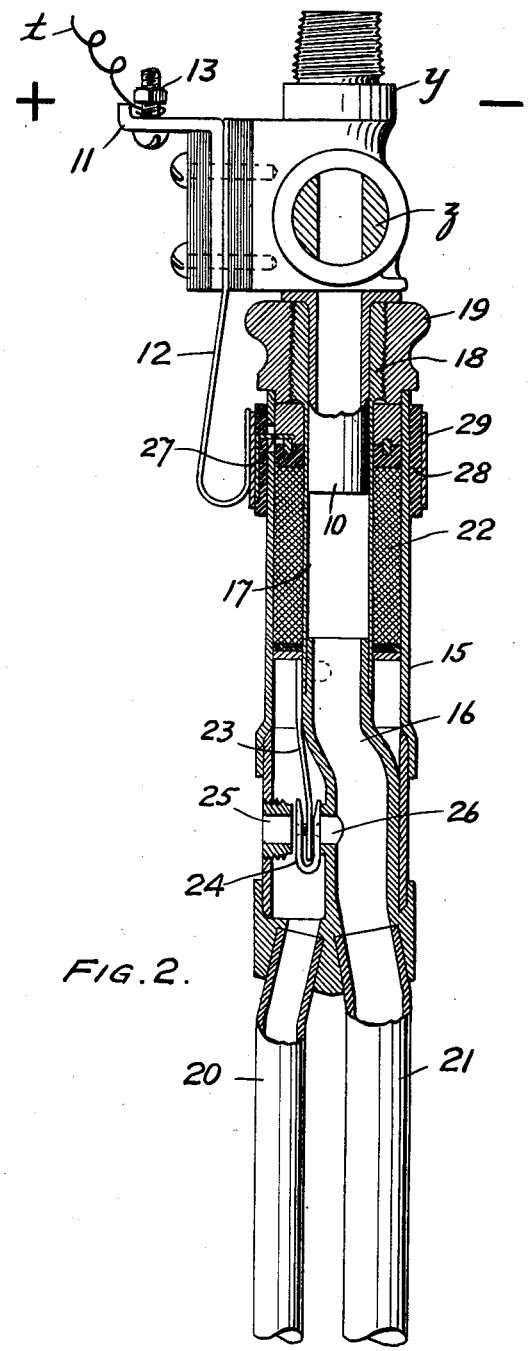
Fig. 2 is a longitudinal sectional view through the end of the hose adapted for connection with the control cock and vacuum pipe, the electro-magnet and primary pneumatic pulsator and the circuit closing devices.

When the magnet 22 is not energized, armature 23 occupies the position shown in Fig. 2, the valve 24 being held on port 26 by the suction in tube 16. Hence hose 20, chamber $h$ and tube $d$ are connected with atmosphere. When magnet 22 is energized, its armature 23 is swung to the left, closing port 25 and opening port 26, thereby connecting hose 20 with the vacuum in tube 16. The alternate opening and closing of the circuit by means of the primary electric pulsator (gear $n$, strip $o$ and brush $q$) has been described. It will therefore be understood how the secondary electric pulsator (magnet 22) controls the primary pulsator (armature 23 and valve 24), to produce primary pneumatic pulsations in the hose 20, pulsation chamber $h$ and pulsation pipe $d$.

From the foregoing description it will be understood that when the opposite ends of the double hose 20, 21 are connected to the casing on the pail and to the vacuum pipe $w$, a complete electric circuit is established through the generator $r$ and magnet 22, and that as soon as cock $z$ is opened, the milking machine will operate. My invention thus dispenses with the necessity of providing any special means for manually closing the electric pulsation circuit, this being accomplished automatically by connecting the hose with the milking machine unit and the vacuum pipe. Aside, however, from the automatic closing of the electric circuit, the described construction, or such modification thereof as is within the skill of the mechanic, exhibits substantial novelty and possesses substantial advantages.

Having now fully described my invention, what I claim and desire to protect by Letters Patent is:

1. In a milking machine, the combination with a vacuum pipe and means to create suction therein, of a milking machine unit comprising a vacuum hose and a pulsation hose, means carried on the ends of both said hose and movable into operative relation with the vacuum pipe at any one of different points along the length thereof to mechanically connect the ends of said hose with the vacuum pipe and to pneumatically connect the vacuum pipe with the vacuum hose, and an electrically controllable pneumatic pulsator carried by said connecting means and adapted, when said connecting means are in the specified operative relation with the vacuum pipe, to be operated to connect the pulsation hose alternately with the vacuum pipe and a source of higher pressure.

2. In a milking machine, the combination with a milking machine unit comprising a vacuum hose and a pulsation hose, of a vacuum pipe and means to create suction therein, couplers secured at different points along and pneumatically connected with the vacuum pipe, and a connector to which said vacuum hose and pulsation hose are secured; said connector comprising a vacuum passage open to the vacuum hose, a pneumatic pulsator adapted to connect said pulsation hose alternately with said vacuum passage and a source of higher pressure, and electrically operable means adapted to control the operation of the pneumatic pulsator; said connector being separate from said couplers and connectible with any of them to open the vacuum passage of the connector to said vacuum pipe.

3. In a milking machine, the combination with a milking machine unit comprising a vacuum hose and a pulsation hose, of a vacuum pipe and means to create suction therein, couplers secured at different points along and pneumatically connected with the vacuum pipe, and a connector to which said vacuum hose and pulsation hose are secured; said connector comprising a vacuum passage open to the vacuum hose, a pneumatic pulsator adapted to connect said pulsation hose alternately with said vacuum passage and a source of higher pressure, and electrically operable means adapted to control the operation of the pneumatic pulsator; said connector being separate from said couplers and connectible with any of them to open the vacuum passage of the connector to said vacuum pipe; a normally open electric circuit, and means closing said circuit through said electrically operable means when the connector is connected with a coupler.

4. In a milking machine, the combination with a milking machine unit comprising a vacuum hose and a pulsation hose, of a vacuum pipe and means to create suction therein, couplers secured at different points along and pneumatically connected with the vacuum pipe, and a connector to which said vacuum hose and pulsation hose are secured; said connector comprising a vacuum passage open to the vacuum hose, a pneumatic pulsator adapted to connect said pulsation hose alternately with said vacuum passage and a source of higher pressure, and an electromagnet adapted to control the operation of the pneumatic pulsator; said connector being attachable to and detachable from any of said couplers and adapted, when connected with a coupler, to open its vacuum passage to said vacuum pipe, one pole of the magnet being in electrical connection with the body of the connector, a contact piece carried by and insulated from the connector and in electrical connection with the other pole of the magnet, a normally open electric circuit one pole of which is in electrical connection with the vacuum tube and the couplers, and a contact finger in stationary relation with each coupler and which is connected with the other pole of said circuit and which is engageable with said contact piece when the connector is connected to such coupler.

5. In a milking machine, the combination with a milking machine unit comprising means providing a vacuum passage and a pneumatic pulsation passage, of a vacuum pipe and means to create suction therein, a vacuum hose one end of which is connected with said vacuum passage and a pneumatic pulsation hose one end of which is connected with said pulsation passage, couplers secured at different points along and pneumatically connected with the vacuum pipe, a connecting device at the other ends of both said hose, said connecting device being connectible with any of said couplers to mechanically connect both hose with the coupler and to pneumatically connect the vacuum hose with the vacuum pipe, a pneumatic pulsator, electrically operated means adapted to control the operation of the pneumatic pulsator, said connector being also adapted, when connected with the coupler, to render the electrically operating means operable to control the operation of the pneumatic pulsator to pneumatically connect, through said coupler, the pulsation hose alternately with the vacuum pipe and a source of higher pressure.

In testimony of which invention, I have hereunto set my hand, at city of New York, New York, on this 20th day of December, 1927.

CYRUS HOWARD HAPGOOD.